United States Patent [19]

Ohno et al.

[11] Patent Number: 4,526,628

[45] Date of Patent: Jul. 2, 1985

[54] METHOD OF MANUFACTURING A CAR STABILIZER

[75] Inventors: Akira Ohno; Kanji Inoue, both of Yokohama, Japan

[73] Assignee: NHK Spring Co., Ltd., Yokohama, Japan

[21] Appl. No.: 653,473

[22] Filed: Sep. 20, 1984

Related U.S. Application Data

[63] Continuation of Ser. No. 485,183, Apr. 15, 1983, abandoned.

[30] Foreign Application Priority Data

Apr. 28, 1982 [JP] Japan ................................. 57-72094

[51] Int. Cl.³ ................................................ C21D 9/02
[52] U.S. Cl. .................................... 148/12 B; 148/150
[58] Field of Search ................. 148/12 B, 12.4, 143, 148/150; 29/173

[56] References Cited

U.S. PATENT DOCUMENTS

| | | | |
|---|---|---|---|
| 3,315,982 | 4/1967 | Svendsen | 280/124 |
| 3,589,950 | 6/1971 | Justusson | 148/12 B |
| 4,231,555 | 11/1980 | Saito | 267/154 |
| 4,233,089 | 11/1980 | Lanner | 148/36 |
| 4,336,081 | 6/1982 | Hijikata et al. | 148/12 B |

FOREIGN PATENT DOCUMENTS 150635  11/1981  Japan ................................. 29/173

OTHER PUBLICATIONS

Study of Hollow Stabilizer Bar–Shoji Matsuki, Horikiri Spring Mfg. Co., Ltd., SAE Technical Paper Series.

*Primary Examiner*—Peter K. Skiff
*Attorney, Agent, or Firm*—Frishauf, Holtz, Goodman & Woodward

[57] ABSTRACT

A car stabilizer and a manufacturing method therefor are disclosed. In this method, a straight elongated starting material of carbon steel with a carbon content of 0.10% to 0.35% is first directly quenched by quick heating, and then bent into a predetermined shape. Thereafter, the material is annealed at a low temperature of 100° C. to 400° C., shot-peened as required, and then coated. Thus, a stabilizer is obtained as a final product. The coating may be executed between the steps of quenching and bending.

9 Claims, 6 Drawing Figures

METHOD OF MANUFACTURING A CAR STABILIZER

This application is a continuation of application Ser. No. 485,183, filed Apr. 15, 1983, now abandoned.

BACKGROUND OF THE INVENTION

This invention relates to a car stabilizer and a method for manufacturing the same.

In this invention, a starting material for a stabilizer is a straight material in the shape of, e.g., a pipe which is formed of carbon steel with a carbon content of 0.10% to 0.35%, i.e., low-carbon steel.

A stabilizer 1 of this type used in a car suspension system has a form represented by a solid line in FIG. 1. As shown in FIG. 1, both end portions of the stabilizer 1 are coupled to their corresponding suspension units represented by broken lines so that the stabilizer 1 serves to stabilize a car when it makes a turn.

Prior art stabilizers of this construction have long been formed from solid steel materials. Recently, however, pipe materials have been used in order to contribute to lightweight car design.

These stabilizers are conventionally manufactured in accordance with the steps illustrated in FIG. 2. A straight material is bent into a predetermined shape in a bending process A as a first step, and then heat-treated in a quenching process B as a second step and then tempered in a tempering process C as a third step. Distortion of the material caused by the processing in these steps is corrected in a reforming process D as a fourth step, shot-peened as required in a process E, and coated and treated against rust in a coating process F as a final step. Thus, a stabilizer is obtained as a final product.

According to the prior art manufacturing method, as described above, the material is heat-treated in the second and third steps B and C after it is bent in the first step A. Therefore, it requires large-sized equipment to place the bent piece in a furnace for heat treatment. A typical example of the furnace is a heavy-oil furnace which may be used for heat treatment of spring materials. The use of the heavy-oil furnace, however, constitutes an excessive expenditure of working energy. Since the heat treatment is performed in the steps B and C after the bending process in the first step A, the subsequent reforming process D becomes essential to the prior art manufacturing method, requiring additional time and labor.

SUMMARY OF THE INVENTION

The object of this invention is to provide a car stabilizer and a manufacturing method therefor, which eliminates the aforementioned problems of the prior art method and facilitates the manufacture of high-quality products without requiring either large-sized equipment for a quenching process or a process for reforming the material after heat treatment.

In order to attain the above object, according to this invention, a straight elongated starting material, e.g., a pipe material, of carbon steel with carbon content of 0.10% to 0.35% is directly quenched before it is bent into the shape of a stabilizer. Then, the material is bent without being tempered, annealed at a low temperature of 100° C. to 400° C., and then shot-peened as required. Coating and rustproof treatment of the material surface may be executed after the low-temperature annealing or between the quenching and bending processes.

According to the manufacturing method of the invention described above, the straight material can be quenched as it is, so that the heating equipment can be reduced in size, and it is possible to obviate the necessity of the reforming process which has conventionally been required after heat treatment. Moreover, the low-temperature annealing ensures satisfactory age hardening, which provides high-quality stabilizers as final products with a high yield point.

In this manufacturing method of the invention, so-called low-carbon steel (with a carbon content of 0.10% to 0.35%) is used for the starting material. Preferably, the material used should be JIS (Japan Industrial Standard) carbon steel S10C to S35C corresponding to AISI steel No. 1010 to No. 1037. More preferably, the carbon steel used is expected to have a carbon content of 0.20% to 0.30%.

The quenching process should preferably employ quick heating, more specifically, electric heating such as high-frequency induction heating or direct resistance heating. The material is preferably heated to 900° C. or more and at such a high speed that its temperature reaches 900° C. within 50 seconds. By such quenching, the material can obtain a martensite structure with good toughness, and the fineness of the grain surface texture can be improved. Beside these outstanding effects, compressive residual stress may be produced near the surface and the yield point can be kept relatively low, so that the bending in the next step can be facilitated.

The temperature used in the low-temperature annealing process should more preferably range from 300° C. to 400° C. By this process, the age hardening is accelerated and the yield point of the material can be raised without substantially reducing the tensile strength. Thus, the resultant stabilizer as a final product can effectively obtain the desired spring function.

The method of this invention does not require a reforming process which has heretofore been required in the prior art method after the heat treatment for quenching and tempering. Thus, the manufacturing processes are reduced in number.

Although the material used in this invention may be either a solid material or a hollow pipe material, the invention is expressly adapted to a method for manufacturing a hollow stabilizer by using a pipe material.

DETAILED DESCRIPTION OF THE PREFERRED EMBODIMENTS

Embodiments of this invention will be described in detail with reference to the accompanying drawings of FIGS. 3 to 6.

Figure 3:
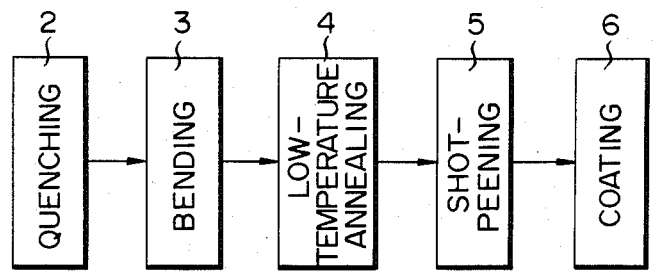
FIGS. 3 and 4 illustrate processes of methods for manufacturing stabilizers according to this invention.

FIG. 3 shows processes of a manufacturing method according to this invention. First, in a quenching process 2, a stabilizer starting material 1' formed of a straight hollow steel pipe is hardened by quick heating. This process is preferably based on an electrical heating method, such as high-frequency induction heating or direct resistance heating. In either method, the material 1' is heated to 900° C. or more and at such a high speed that its temperature reaches approximately 900° C. within 50 seconds.

Figure 5:
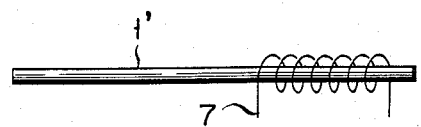
FIG. 5 is a schematic view of a high-frequency heater used in a quenching process of the manufacturing method of the invention.

In quenching by the high-frequency induction heating, as schematically shown in FIG. 5, the straight material 1' is passed through a high-frequency induction coil 7 so that the surface of the material 1' is quickly heated. Immediately after the heating, water is sprayed on the material 1' to quench and harden it. In quenching by the quick heating process, a martensite structure with good toughness can be produced in the material 1' by suitably selecting the heating speed, temperature, and material transfer speed. Thus, the crystal grain is made finer to improve the surface texture of the material 1'. Moreover, compressive residual stress is produced near the surface of the material 1' to facilitate bending in the next step, in conjunction with the aforesaid several effects.

The material 1' used in this embodiment is low-carbon steel with an outside diameter of 22.2 mm, wall thickness of 2.6 mm, and carbon content of 0.20% (JIS S20C or AISI No. 1021). In the quenching process, the material 1' is heated by a high-frequency heater of 20-kW output. The material 1' in the coil 7 moves at a speed of 10 to 13 mm/s. Under these conditions, a sufficient quenching effect was obtained. It was noted that the speed of passage of the material 1' through the coil 7 should preferably range from 9 to 14 mm/s in the quenching process under those conditions. If the speed is below 9 mm/s, the surface of the material 1' may suffer a quenching crack in the next bending process. If the speed exceeds 14 mm/s, the material 1' cannot enjoy satisfactory quenching.

The material 1' is bent into a desired shape in a subsequent bending process 3. This bending process 3 is characterized in that the material 1' is tempered after it is quenched.

Then, the material 1' is annealed within a low temperature range of 100° C. to 400° C. in a low-temperature annealing process 4. By doing this, age hardening is accelerated, and the yield point can be elevated without reducing the tensile strength. Thus, the material 1' can effectively exhibit a function as a spring.

Preferably, the material 1' should be annealed within a temperature range of 300° C. to 400° C.

Then, the fatigue durability can be improved in a shot peening process 5. Depending on the kind of stabilizer required, however, this process 5 may be omitted.

Thereafter, the outer and inner peripheral surfaces of the material 1' are coated and treated against rust in a coating process 6. Thus, a stabilizer is obtained as a final product.

Figure 4:
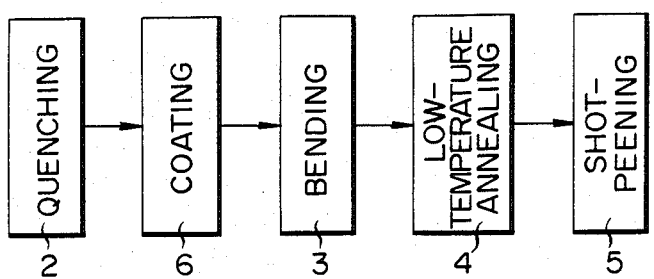

Although the coating process is described as a final step in the foregoing paragraph, it may alternatively be interposed between the quenching process 2 and the bending process 3, as shown in FIG. 4. The embodiment described in FIG. 4 has a special advantage when pipe materials are used for the manufacture of hollow stabilizers; that is, the coating treatment can be performed easily on all surfaces, particularly the inner surface of the pipe material, since the coating process is executed before the bending process, in other words, while the material is still straight. What is essential is that the coating process 6 should follow the quenching process 2 as a heat treatment process.

The shot peening process 5 may also be executed as required in the sequence of FIG. 4.

The results of a comparison of mechanical properties between the stabilizer obtained in accordance with the aforementioned processes according to the present invention and that obtained by the prior art method shown in FIG. 2 tabulate as follows.

TABLE

| | | Heat Treatment | Material | Tensile Strength ($kgf/mm^2$) | 0.2% proof Stress ($kgf/mm^2$) | Hardness (Rockwell C) | Elongation (%) |
|---|---|---|---|---|---|---|---|
| 1 | Prior Art (Tempering at 400° C.) | Quenching/ Tempering | Spring Steel (SUP 9) | 166.7 | 156.0 | 47 | 13.8 |
| 2 | Present Invention (After Quenching) | Quenching (High-frequency inductance heating) | Carbon Steel (S20C) | 167.7 | 120.0 | 46 | 15.5 |
| 3 | Present Invention (After Low-temperature annealing at 150° C.) | Quenching (High-frequency induction heating | Carbon Steel (S20C) | 165.0 | 154.5 | 45 | 13.0 |

Figure 1:
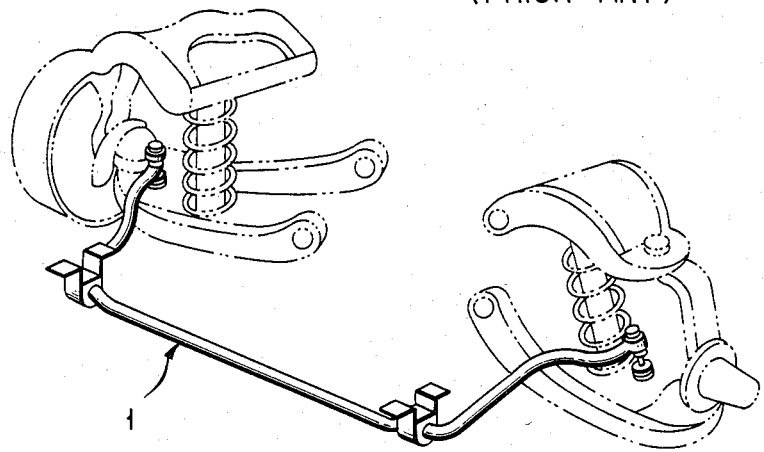
FIG. 1 is a perspective view showing a conventional car stabilizer along with a car suspension system represented by broken lines.
Figure 2:
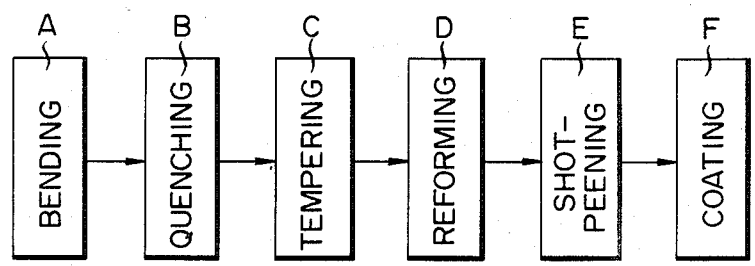
FIG. 2 illustrates processes of a prior art method for manufacturing stabilizers.

In the table above, the first column contains various data on a material after being tempered at 400° C. in accordance with the prior art manufacturing method shown in FIG. 2. The second column contains various corresponding data on a material immediately after being quenched by high-frequency induction heating in accordance with the manufacturing method of the present invention. The third column carries various corresponding data on the material after being annealed at 150° C. in accordance with method of the present invention.

In the table "0.2% proof stress" is defined as the stress which leaves a 0.2% distortion in the material after it is removed, and which can be regarded as equivalent to the yield point.

The material used in the prior art method of the first column is JIS spring steel SUP 9 (corresponding to AISI No. 5155), while the material used in the methods of the present invention of the second and third columns is JIS carbon steel S20C (corresponding to AISI No. 1021).

As seen from the second column of the table, the material used in the method of the invention after quenching is equal in tensile strength to or a little higher than the material used in the prior art method, but is considerably lower in 0.2% proof stress (yield point). This indicates that the bending process in the next step can be executed with ease. When the annealing process following the bending process is ended, as seen from the third column, the 0.2% proof stress of the material in the method of the present invention becomes substantially equal to that of the material in the prior art method without substantially reducing the tensile strength.

The annealing temperature of 150° C. for the method of the present invention is used only for comparison with the prior art method, and is not the most preferable value for the invention. In this invention, as described above, annealing is executed within a temperature range of 100° C. to 400° C., preferably 300° C. to 400° C. and more preferably at 350° C. and thereabouts.

Figure 6:
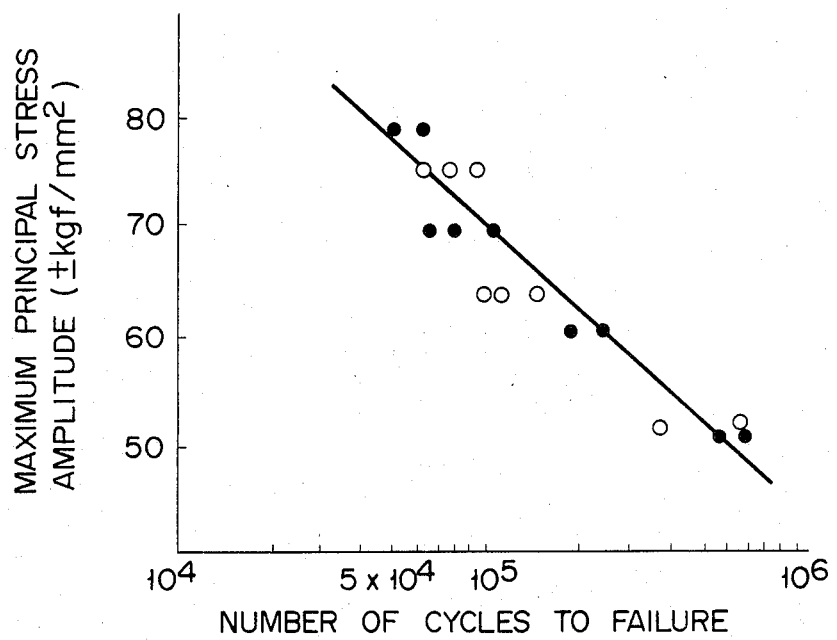
FIG. 6 shows a fatigue characteristic curve for comparison between the prior art stabilizer and the stabilizer according to the invention.

The graph of FIG. 6 shows the results of a comparison of fatigue characteristics between a stabilizer obtained in accordance with the prior art method and a stabilizer obtained by the method of the present invention. In this graph, black spots represent data on a stabilizer using JIS spring steel SUP 9 (AISI NO. 5155) for the material in the prior art method, while circles represent data on a stabilizer using JIS carbon steel S20C (AISI No. 1021) for the material in the method of the invention. In either case, the shot peening process is omitted.

It will be seen from the graph of FIG. 6 that the fatigue characteristics of the stabilizer according to the invention are substantially equivalent to those of the prior art stabilizer.

Although pipe materials are used for the materials in the aforementioned methods, this invention may also be applied to solid materials. However, the invention is better adapted to the manufacture of hollow stabilizers made from pipe materials.

What we claim is:

1. A method for manufacturing a car stabilizer from a straight elongated starting material formed of carbon steel with a carbon content of 0.10% to 0.35%, comprising the steps of
    quickly heating said straight starting material to a temperature of 900° C. or more within 50 seconds;
    then quenching the hot material which was heated by said quick heating;
    then bending the quenched material into a predetermined shape without tempering of the quenched material; and
    then annealing the untempered, bent, quenched material at low temperature.

2. The method according to claim 1, wherein said quickheating and quenching steps employs an induction hardening method.

3. The method according to claim 1, wherein said low-temperature annealing is executed at a processing temperature of 100° C. to 400° C.

4. The method according to claim 1, further comprising coating the surface of said material after said low-temperature annealing.

5. The method according to claim 1, further comprising coating the surface of said material between said steps of quenching and bending.

6. The method according to claim 1, further comprising shot-peening said material after said low-temperature annealing.

7. The method according to claim 1, wherein said starting material is a pipe material.

8. The method according to claim 2, wherein said low-temperature annealing is executed at a processing temperature of 100° C. to 400° C.

9. The method according to claim 1, wherein said step of quickly heating said straight starting material comprises heating said straight starting material at a rate of at least 18° C. per second.

* * * * *